Jan. 21, 1941.  M. J. STACOM  2,229,143

APPARATUS FOR EXPRESSING LIQUIDS FROM SOLID SUBSTANCES

Original Filed March 14, 1938   5 Sheets—Sheet 1

Inventor
MATTHEW J. STACOM

Paul R. Ames
Attorney

Jan. 21, 1941.  M. J. STACOM  2,229,143
APPARATUS FOR EXPRESSING LIQUIDS FROM SOLID SUBSTANCES
Original Filed March 14, 1938  5 Sheets-Sheet 3

Inventor
MATTHEW J. STACOM
Paul R. Ames
Attorney

Jan. 21, 1941.   M. J. STACOM   2,229,143
APPARATUS FOR EXPRESSING LIQUIDS FROM SOLID SUBSTANCES
Original Filed March 14, 1938   5 Sheets-Sheet 5

INVENTOR:
MATTHEW J. STACOM

By Paul R. Ames
ATTORNEY

Patented Jan. 21, 1941

2,229,143

UNITED STATES PATENT OFFICE 2,229,143

APPARATUS FOR EXPRESSING LIQUIDS FROM SOLID SUBSTANCES

Matthew J. Stacom, Flushing, N. Y., assignor to Stacom Process Corporation, Long Island City, N. Y., a corporation of New York Original application March 14, 1938, Serial No. 195,776. Divided and this application January 27, 1939, Serial No. 253,202

21 Claims. (Cl. 100—47)

This invention relates to apparatus for separating liquid from solid constituents by application of great rolling pressures. It is particularly adapted to the separation of the liquids, such as sap, resin, sugars, medicinal substances, etc. from the cellulosic materials of natural plant life, such as tree wood, corn stalks, sugar cane, banana stalks, leaves, such as henequen, hemp, etc., roots, stems, grasses and other plant life having reasonably tough longitudinal fibrous structure, but it may also have other uses.

It is an object of this invention to provide improved apparatus for the expeditious separation of the liquid and solid constituents of plant life or other materials. It is also an object to provide such apparatus wherewith a substantially complete separation of the liquids may be accomplished by a single passage of the material through the apparatus. A further object is to provide a new apparatus for recovering valuable fluids and cellulose from various substances from which it has heretofore been impossible or impractical to recover either or at least both of these substances. It is also an object to provide improved apparatus for recovering such fluids and cellulose in forms in which they have not been heretofore available. A more specific object is to provide improved feeding and guiding means for apparatus of the class described. A further specific object is to provide improved pressure applying means for such apparatus. Another object is to provide an improved combination of a ring and roll type of apparatus for separating liquid and solid constituents with a particular form of pressure applying means. Numerous other objects and advantages will become apparent as the description proceeds.

In describing the invention, reference will be made to the drawings in which certain preferred embodiments are illustrated. It is not intended, however, to limit the invention to the specific form of apparatus shown or described.

Throughout the drawings like reference characters indicate like parts.

Figure 1:
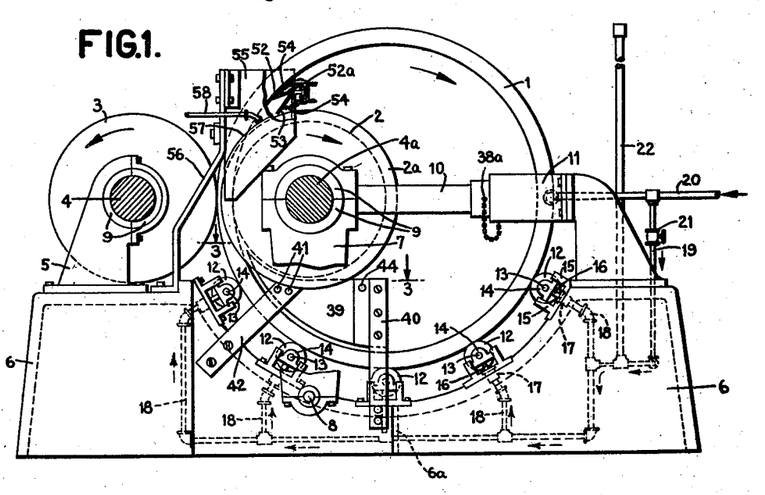
Figure 1 is a side elevation of a device embodying the invention, with parts broken away and the driving gears removed for clearness.
Figure 2:
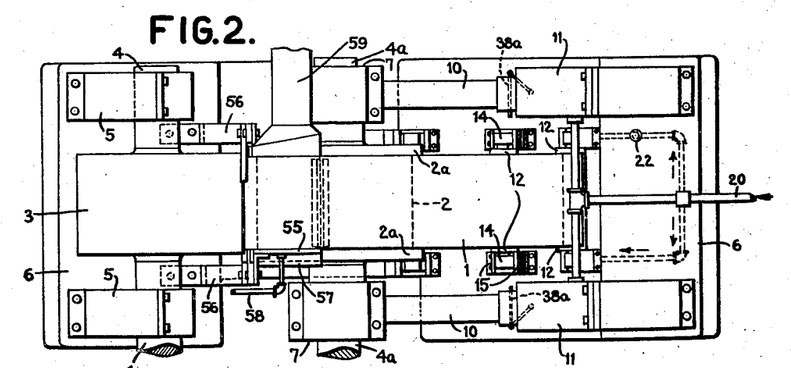
Figure 2 is a plan view of the device shown in Figure 1.

The device illustrated in Figures 1 and 2 is made of a ring or shell 1, a roller 2 nested within the ring so that its outer surface rolls upon the inner surface of the ring, and an antifriction roller 3, adapted to roll upon the outer surface of the ring 1. The contacting surfaces of the ring and rollers should be of hard steel or other material suited to withstand the heavy pressures applied to the material being treated. In some instances, it may be desirable to apply a lining of suitable material to the inner surface of the ring and the outer surface of the roller 2.

The roller 3 is carried on a shaft 4 which is supported in standards 5, 5 resting upon and fastened to the frame 6 at opposite ends of the roller. The roller 2 is carried on a shaft 4a, which shaft is carried in bearings in the arms 7, 7 pivotally supported from the frame 6 as illustrated at 8. In view of the great pressures on the shafts 4 and 4a, it is preferred to use oilless bearings for these shafts, such bearings being illustrated at 9, 9. They may be made up in two parts, of radially perforated bearing metal (for example bronze), the perforations being filled with graphite or other suitable non-liquid lubricating substance.

The roller 2 may be forced toward the inner surface of the ring 1 by means of hydraulic pressure applied to pistons 10, 10 terminating at one end in cylinders 11, 11 and at the other end bearing upon the supports 7, 7 for the roller 2. The pressure applied to the supports 7, 7 forces the roller 2 and the ring 1 against the antifriction roller 3 supported in the standards 5, 5 fixed to the base 6.

Figure 4:
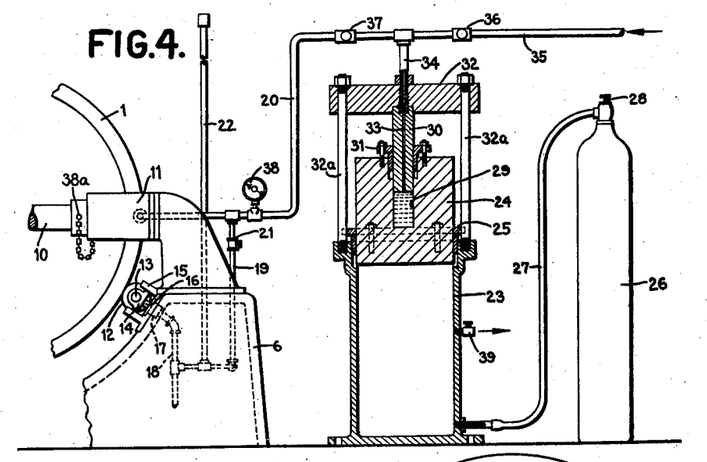
Figure 4 is a vertical section of means for producing the hydraulic pressure applied to the pressure roller in Figure 1.

The hydraulic pressure may be applied to the pistons 10, 10 by an arrangement as illustrated in Figure 4. A cylinder 23 is provided with a piston 24, which passes through a stuffing box 25. A container 26 of compressed gas, such as nitrogen or some other compressed gas that is economically available, may be connected to the cylinder 23 by means of a flexible or other tubing 27, a valve 28 being provided to control the flow of gas. The piston 24 is bored out at 29 to provide a cylinder of much less diameter than that of the cylinder 23. A fixed piston 30 extends into the cylinder 24 through the stuffing box 31. This piston is held rigidly in place in the plate 32, which plate is supported in fixed spaced relationship to the cylinder 23 by the bolts 32a. The piston 30 is also provided with a bore 33 communicating at its lower end with the bore 29 and at its upper end with the branch 34 of the high pressure pipe 20 leading to the cylinders 11, 11. An inlet pipe 35, with a valve 36, is provided for leading the pressure fluid from a source of supply (not shown). A shut-off valve 37 and a gauge 38, for indicating fluid pressure per square inch in the cylinders 11, 11 are provided in the pipe 20. A blow-off valve 39 is provided in the cylinder 23. The term "gas" as used herein and in the appended claims is used in its generic sense and is defined as including air. The source of the gas may be the compressed gas container 26, the accumulator of a compressor, or any other convenient source of supply.

In operating the hydraulic pressure mechanism, the piston 24 may be positioned intermediate the ends of the cylinder 23 by regulating the pressure in that cylinder and the cylinders 11 and bore 33 and the pipes between them may be filled with water or other suitable fluid. The valve 36 is then closed and the valve 28 opened. Additional gas from the steel bottle 26, having a pressure, for example, of about 1000 pounds per square inch, is then introduced into the cylinder 23, forcing the piston 24 upward. In view of the difference in areas of the pistons 24 and 30, this movement of the piston 24 subjects the water in bore 29 and also in the cylinders 11, 11 to about 20 times the pressure per square inch exerted by the gas in cylinder 23. If the two pressure plungers 10, 10 have an aggregate total cross sectional area of 32 square inches the total pressure resisting movement of the roll 2 will be $$32 \times 20 = 640$$

times the gas pressure per square inch in cylinder 23, or 32 times the gauge pressure at 38. Thus the total pressure on the roller 2 may be calculated by the following formula:

Total pressure on roller 2 =

$$\frac{\text{area of piston 24}}{\text{area of piston 30}} \times$$

Total area of pistons 10, 10 × pressure in cylinder 23;

Or = total area of pistons, 10, 10 × gauge pressure at 38.

For example, if the pressure in cylinder 23 is 200 pounds per square inch, the material between the roll 2 and the ring 1 will be subjected to a total pressure of 128,000 pounds distributed over a length equal to the width of the material being processed. Even half this amount will reduce a strip of soft pine wood one inch wide and ¼ inch thick to a relatively dry, loose, fluffy, friable mass of flakes or matted fibres which have been substantially freed from its original resin and other natural gummy constituents. These fibres may be screened down to lots of graded lengths or they may be driven through a hammer or impact mill, or other types of pulverizing or disintegrating mill, using a fine screen, without clogging the mesh thereof. Some of these lots can be used directly in paper making and all are in a most favorable condition for subsequent chemical treatments, similar to those now employed in the making of paper, artificial silk or other cellulose products, although in view of the removal of constituents by the processing, such chemical treatment may be much less drastic.

Good results may be obtained with pine, fir, or similar woods, green or soaked, when treated in strips one inch wide and ¼ inch thick, in a machine as described above with a hydraulic pressure of about 1300 to 2000 pounds per square inch and upwards in the cylinders 11, 11 (which in the machine illustrated are each 4½ inches in diameter). A machine designed for processing wood slabs up to about 1 inch thick and sixteen inches wide may carry a pressure capacity of 1,600,000 pounds distributed over a roll surface ranging between 40 and 50 inches in length.

The pressure forcing the roller 2 toward the roller 3 may be relied upon to yieldingly support the ring 1. As the material being treated is passed through the machine the pressure will cause the ring 1 to dip, resulting in important advantages because of the change in the position of the lower and upper horn angles (i. e: the curvilinear angles between the surfaces of the roller 2 and the ring 1). For some uses it is preferred to provide additional yielding supports, such as the antifriction rollers 12, 12. Each of these rollers is carried on a shaft 13 in bearing block 14, 14 on the opposite sides of the roller, which blocks slide in guides 15, 15 fixed to the frame 6. The blocks 14 are each fixed to the end of a piston 16, which piston terminates at the other end of a cylinder 17 fixed to the frame 6. If desired, adjustable stops, such as set screws 14a, may be provided for regulating the outward movement of the blocks 14. Hydraulic pressure may be applied to the cylinders 17 from an independent source or through the pipes 18 connected, through the pipe 19, to the main pressure line 20 leading to the cylinders 11. If the latter arrangement is used it is desirable to have the rollers 12 move independently of the main pressure system so a valve 21 is provided in the line 19. An air trap, consisting of a closed pipe 22 connected to the pipe 19, is provided to give a yielding pressure upon the rollers 12. In preparing to use the rollers 12, the valve 21 is opened and liquid admitted, whereby sufficient pressure is applied to the pistons 16 to raise the ring 1 to the desired position when the pressure on the cylinders 11 is released. When adjustable or other stops are provided, the ring may be raised until the blocks 14 hit the stops and the air in 22 is sufficiently compressed to provide the desired resistance to movement of the ring. The valve 21 is then closed and the air confined within the trap 22 serves to provide a yielding resistance to downward movement of the ring 1 in use.

When the antifriction rollers 12 are provided to support the ring 1, pins 38a, 38a extending through registering holes in pistons 10 and collars surrounding the pistons, are provided so as to retain the pistons in position when the pressure in the trap 22 is adjusted and to keep the roller slightly separated from the ring when not in use, whereby the parts may be relieved from strain when not in use.

If desired, the roller 2 may be provided with annular flanges 2a on each side and adapted to fit close to the edges of the ring 1. These flanges serve to guide the ring 1 and to prevent the extrusion from between the ring and roller of any of the material being treated. Also, because the flange moves with the ring, any material contacting it from between the roll and the ring will contact a surface moving in the same direction rather than a fixed guide.

Figure 3:
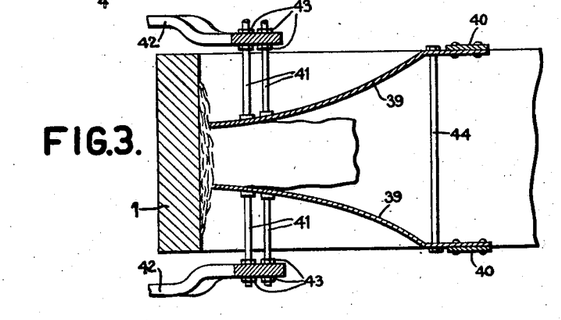
Figure 3 is a detailed substantially horizontal section on irregular line 3—3 of Figure 1, which passes under the interior roller

Guide plates 39, 39 may be provided for guiding the material being processed to the desired section of the pressure zone and to prevent turning of the material as it enters this zone. Since the material spreads out considerably on being processed, such guiding is desirable to prevent the material from extruding from the sides of the ring. It also prevents turning of the material when a knot is struck or when the piece is put in at an angle. For this purpose, it is preferred to have the guide plates 39, 39 extend into the horn angle to such an extent that the distance from the end of the plates to the line of maximum pressure is less than the distance from the inner end of each plate 39 to the edge of the ring 1. The guide plates 39, 39 may be supported at their rear ends by the supports 40, 40 fixed to the frame 6 and at their front ends by the rods 41. The rods 41 may be welded or otherwise fastened to the plates 39 and extend between them and the support brackets 42, 42 fixed to the frame 6. The rods 41 may be threaded and provided with nuts 43 for positioning the inner end of the guide at the desired place. A tie rod 44 may be provided for bracing and properly spacing the rear ends of the plates 39.

Various means may be provided for rotating the pressure members of the device in the directions indicated by arrows in Figure 1. It is preferred to drive both the interior roller 2 and the antifriction roller 3, although, if desired, only the interior roller 2 need be directly driven and the ring and roller 3 will be driven through their frictional contact. When the rollers 2 and 3 are both driven, it is preferred that they either be driven at different angular speeds so that they will have the same peripheral speeds as the surfaces of the ring 1 with which they contact, or, as illustrated in the drawings, that the outer roller be of a greater diameter than the inner roller, so that when they are driven at the same angular speed their peripheral speeds will be the same as the surfaces with which they contact.

Figure 5:
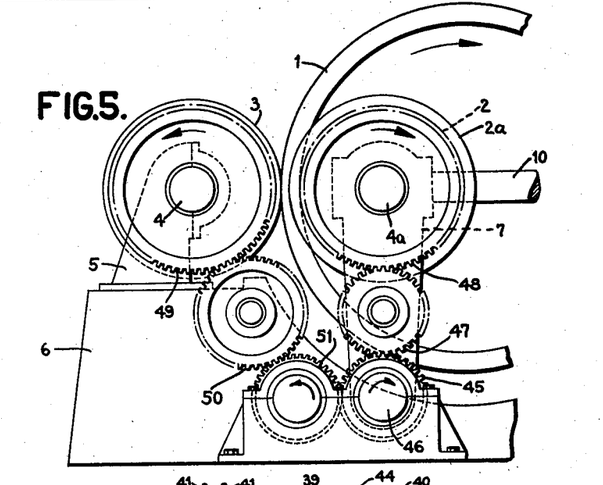
Figure 5 is a vertical elevation showing a driving mechanism for the rollers.

Figure 5 illustrates a means for driving the rollers 2 and 3 at the same time. In this arrangement the gear 45 may be fixed to a shaft 46 which is driven in a clockwise direction, as viewed in Figure 5. An idler gear 47 meshes with the gear 45 and a gear 48 fixed to the roller 2. The gear 49 on the roller 3 is driven from the gear 45, in the direction opposite to that of the roller 2, through the idler gears 50 and 51. When the roller 2 moves against the pressure on the pistons 10, 10, the gear 48 will roll on the gear 47, so that the teeth will remain in mesh.

Other means may be provided for driving both rollers or for driving the ring through one of the rollers.

In operating the machine the hydraulic pressure on the pistons 10 is adjusted depending upon the material being treated and the use to which the resultant cellulosic materials is to be put. For example, in the processing of henequen in the green state for the recovery of long fibres for use in rope, etc., a total pressure by the roller 2 of about 15,000 to 30,000 pounds per leaf of approximately 3 inch width is adequate. If the fibres are to be used for paper making and a more complete removal of the fluids is desired, a greater pressure may be applied. When it is desired to process strips of spruce ¼ inch thick to recover cellulose for use in making paper, a pressure of about 20,000 to 35,000 pounds per line inch of width of material being treated may be used. If the same wood is to be treated to produce cellulose for use in the production of artificial silk or Cellophane or other uses where the cellulose is put into solution, greater pressure may be applied and a more complete separation of the liquids may be accomplished. The length of the wood strip will depend on the space between the ring and the back surface of the roller 2. Preferably the length should be such that the strip will be bent, since this tends to open the seams so that the liquid may be more readily separated.

After adjusting the pressure to resist movement of the roller 2, the rollers are driven as illustrated in Figure 1 and the material being treated is introduced longitudinally into the space between the guide plates 39.

The ring 1 will be rotated by the friction of the rollers 2 and 3 on it and the material being processed will be drawn into and through the pressure zone, the pressure being gradually but quickly increased until the maximum is reached. The ring 1 will dip, thus changing the position of the lower and upper horn angles and providing a flexible gripping means to assist in drawing the material into the zone of maximum pressure, such change depending upon the thickness and resistance to compression of the material being processed. The roller 2 will, of course, give sufficiently against the yielding pressure to permit the material to pass through the machine. During the treatment the ring 1 will be driven from the roller 2 through the material under treatment. The pressure will express substantially all or at least the major portion of the liquids from the cellulosic material, and a relatively dry material will leave the pressure zone; whatever moisture is retained on the porous fibrillated cellulose may be quickly removed by evaporation. This drying may be expedited, if desired, by putting the product in the sunlight or applying slight heat. If left in the sunlight, a partial bleaching of the cellulose fibres will be accomplished.

The liquids expressed from the material will flow down the inside surface of the imperforate ring 1 and into a suitable trough or other collecting means under the ring. For example, the frame 6 may be in the form of a trough and the liquid may flow out through the drain 6a. From there, it may be pumped or flowed or be otherwise conveyed to means for separating the valuable constituents in it. When the fluids extruded are sticky or too thick to flow readily it may be advantageous to apply water to assist their flow away from the pressure zone. This may be accomplished by applying a spray of water to the ring surface in the lower horn angle and just below the zone of maximum pressure. The separation of liquids and solids in the extruded fluids may be expedited by application of cold at the proper elevation so that the solids will settle more readily.

If desired, the ring and the rollers may be on a slightly inclined axis so that the liquids will flow toward one edge of the ring. Or a stream of air or other fluid may be applied to direct the flow of expressed liquids toward one edge of the ring. Also, the ring and/or rollers may be of other shapes, such, for example, as frusto-conical.

Figure 11:
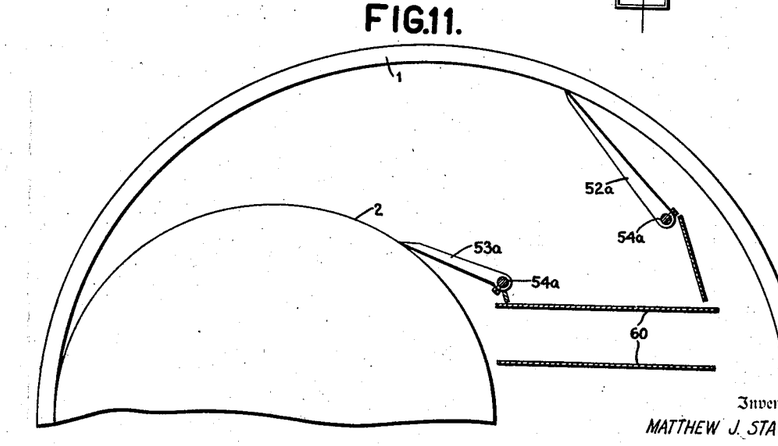
Figure 11 is a fractional side elevation showing a modified device for the removal of a processed material.
Figure 12:
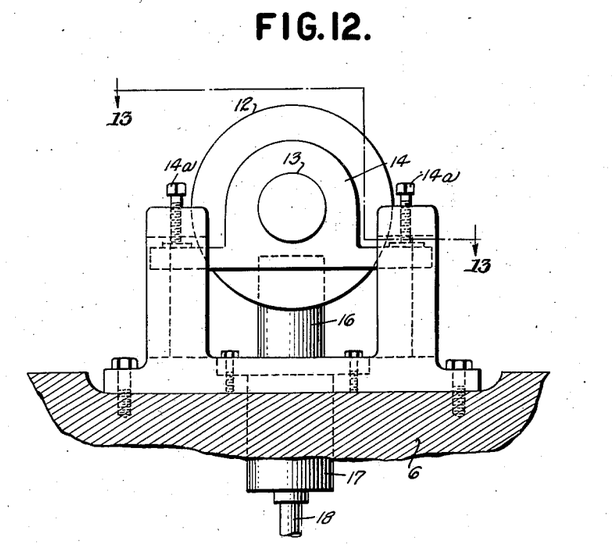
Figure 12 is an enlarged detail side elevation of one of the anti-friction rollers.
Figure 13:
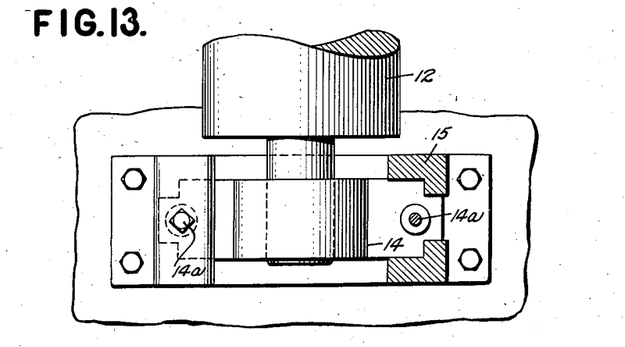
Figure 13 is a view on the line 13—13 of Figure 12.

With some materials it may be advantageous to position the roller 2 at a higher elevation so that it would contact the ring above the horizontal diameter of the ring, thus providing for additional space in the lower horn angle for the removal of liquids.

Where the material is subjected to sufficient pressure to produce a finely divided cellulosic material, it may be removed from the rolls with an arrangement as illustrated in Figure 1. A pair of scrapers 52 and 53 hinged together at 52a may be drawn against the ring and the roller surfaces, respectively, by springs 54. A plate 55 may be supported from the frame 6 by a bracket 56. This plate is shaped to fit close to the edge of the ring 1 and the edges of the scrapers 52 and 53, and may be recessed at 57 to receive the rim 2a of the roller 2, if such a rim is used. A jet of air may be delivered by the pipe 58 to a nozzle positioned in the space enclosed by the scrapers 52 and 53 and the surfaces of the roller 2 and the ring 1. A conduit 59 may be provided at the opposite end of the roller 2 to receive the material removed from the surfaces by the scrapers and blown by the air jet. If desired, suction may be applied to this conduit. The above described arrangements of scrapers, etc. are described and claimed in my copending application Serial No. 115,324, filed December 11, 1936. From there, the material may be led by suitable conveyors to where it is to be used. If it is to be used in paper making, it may be conveyed directly to the digesters or beaters for further treatment or bleaching or it may be blown into an impact or centrifugal pulverizing mill or other suitable type and through screens or a cyclone separator to separate the various fibre lengths. If desired, the fibres may be further reduced in such a mill to the same size as fine ground wood or to wood flour. The relatively complete removal of the resins, etc. from the cellulose will facilitate such subsequent disintegration steps as may be desirable. If it is to be used for fuel it might be blown directly into the furnace or other combustion zone. If desired, opportunity may be given for the moisture to evaporate from it and, if necessary, heat may be supplied for this purpose.

Where the solid material to be separated is not to be so finely divided, such, for example, as in the production of long fibres from henequen, hemp, etc., the processed solids may be scraped from the surfaces onto a conveyor belt as illustrated in Figure 11. The scrapers 52b and 53a, held against the ring and roller, respectively, by springs such as the springs 54 (Figure 1), scrape the processed material from the surfaces onto an endless belt 60 having its upper surface moving, for example, toward the side of the ring opposite that to which the material to be processed is fed. From there the processed material may be conveyed by suitable means to the next step in its treatment or use.

In either of the arrangements described above for disposing of the treated material, the scrapers 52 and 53 or 52b and 53a may be held against the surfaces by other means, or may be reciprocated along the surface of the blade to avoid concentration of heat and wearing of any particular portion of the blade or of the ring.

Figure 6:
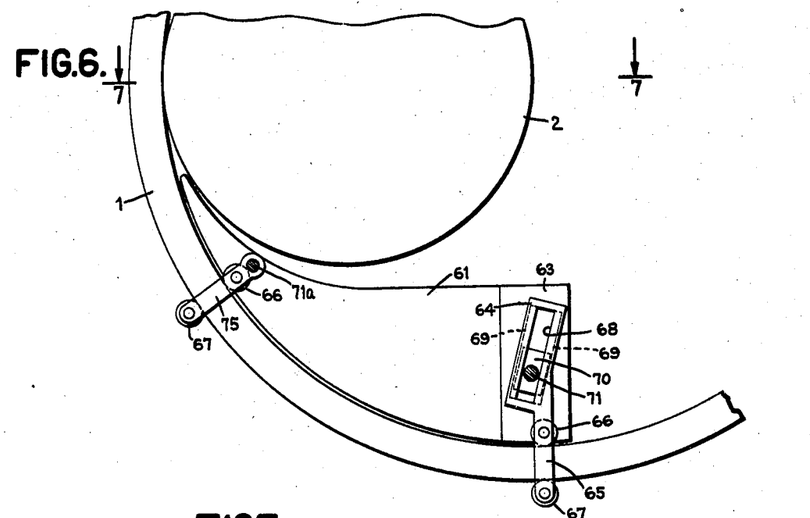
Figure 6 is a fractional side elevation showing a modified form of guide.
Figure 7:
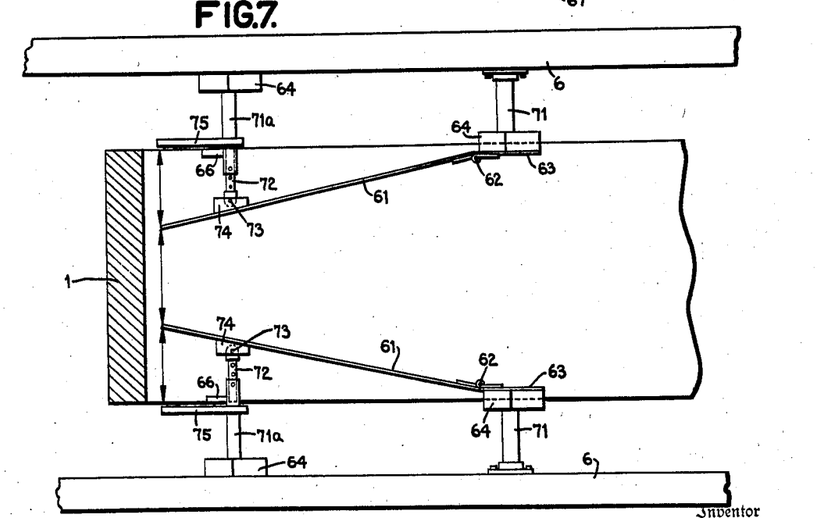
Figure 7 is a view taken on line 7—7 of Figure 6 with the interior roller omitted for clearness.

Figures 6 and 7 illustrate a preferred form of guide which is correlated with the movement of the ring. This guide takes the place of the fixed guide shown in Figure 3. With this arrangement the side plates 61, 61 are hinged at 62 to the plates 63, 63. Sleeve guides 64 provided with downwardly projecting arms 65 are welded or otherwise fastened to the outer surfaces of the plates 63. Rollers 66 rotating on shafts extending inwardly from and carried by the arms 65 space the plates 63 from the ring 1. Rollers 67, also rotating on shafts carried by the arm 65, roll on the outer surface of the ring 1 and cause the guide to dip when the ring dips. The sleeve guides 64 are also each provided with an elongated or arcuate slot 68 with undercut portions 69, 69. Block or plates 70, fastened rigidly to the rods 71, slide freely in the recesses in the guides 64. The other ends of the rods 71 are fastened rigidly to the frame 6 or to rigid projections from the frame.

The upper ends of the plates 61 are arranged to move with the ring 1 in a similar manner. In this case, however, the sleeve guides 64 with the recesses 69 are illustrated as fastened to the frame 6 or to extensions from it. Each of the rods 71a is fixed at its outer end to a block 70, positioned within a recess 69, and has its other end bored out to receive a rod 72. The rods 72 are pivoted at 73 to blocks 74 fixed to the plates 61. The castings 75, through which the rods 71a pass, carry rollers 66 and 67 which roll on opposite sides of the ring 1. The rods 72 are provided with holes spaced along their lengths and adapted to receive pins passing through holes in the bored out portion of the rods 71a. With this arrangement the distance between the end of each plate 61 and the edge of the ring 1 may be adjusted, depending upon the portion of the surface to which the material is to be fed and the extent to which the material being treated flattens out.

Figure 8:
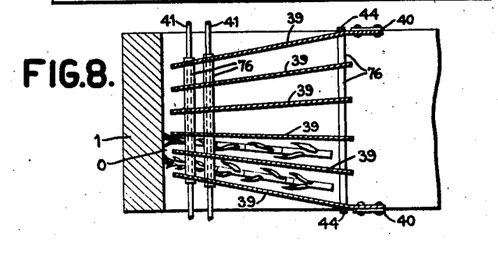
Figure 8 is a detailed section similar to Figure 3 showing another modified form of guide.

With this arrangement the guide will follow the ring 1 as the ring dips when the material being processed passes under the roller 2. This dipping of the ring 1 is an important feature of the invention. It permits the upper and lower horn angles to shift their positions around the roller 2 so as to provide a wider opening and a more flexible gripping means for the material being treated. This dipping also shifts the position of the line at which the surfaces are in closest contact to a position above the direct line of pressure from the pistons 10, 10, thus reducing the magnitude of force applied to the material as it approaches the line of closest contact between the operative surfaces. An advantage of the correlated guide construction which has been described is that it assists in preventing the material which is being fed through the machine from twisting, swinging or turning sidewise when the ring dips under pressure. With a stationary guide there is a tendency for the material to twist and turn as the ring dips away from the guide. This may result in the material being fed through the machine crosswise instead of longitudinally— i. e. lengthwise with respect to its fibres. Another advantage is that when the guide is correlated to move with the ring, the sides of the guide keep the material from squeezing out at the edges of the ring, and because the sides of the guide follow the movements of the ring, it is unnecessary to provide side plates for the ring unless desired for retention of the liquids.

Where a material, such as sugar cane or corn stalks or long leaves, is being treated, it may be desirable to provide a plurality of guide plates 39, 39, arranged as illustrated in Figure 8. The channels should be so designed with reference one to the other for use with any particular material in the form of stalks, etc. that the portion of such stalks laterally expressed from any one of them in or near the zone of maximum pressure will merge with, but not seriously overlap on, the other, as indicated at O. In this event the outer plates may be supported as illustrated in Figure 3 or correlated as illustrated in Figures 6 and 7. The inner plates may be held in proper spaced relation by the spacers 76 on the rods 41 and 44. When the material which is being fed into the apparatus is quite long, as, for example, when feeding tree trunks, it may be desirable to provide a feeding trough or other guiding means which preferably is provided with antifriction rollers along the sides and/or bottom of the trough.

Figure 9:
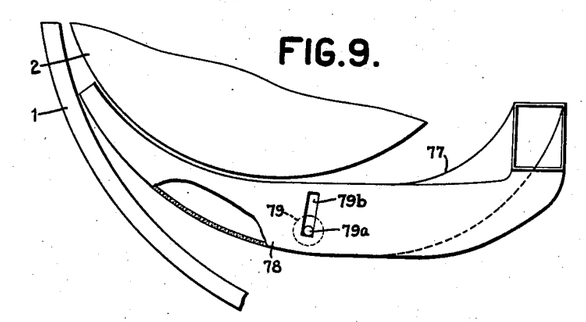
Figure 9 is a fractional side elevation showing another modified form of guide.
Figure 10:
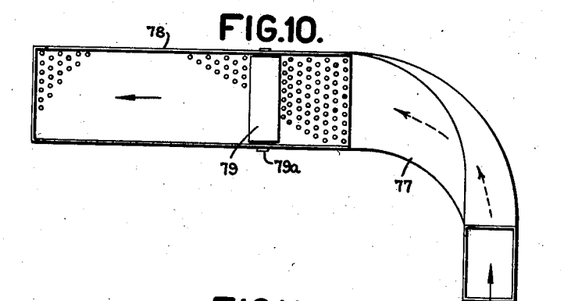
Figure 10 is a top plan view of the guide shown in Figure 9.

Figures 9 and 10 illustrate a preferred form of feed guide particularly adapted for feeding long flexible materials such as henequen leaves or corn stalks, etc. This guide includes a curved trough 77 terminating in an upwardly curved perforated tray 78. With this arrangement any of the expressed liquid that gets into the trough will run through the perforations into the ring 1. This guide is also provided with a levelling roller 79 on a shaft 79a movable in slots 79b. The weight of this roller is such that the material being fed may be rolled under it and will be held close to the bottom surface of the trough and so fed close to the ring surface. If necessary, resilient pressure may be applied to the shaft 79a. The trough 77 may be supported in fixed relation to the frame in a manner similar to that illustrated in Figures 1 and 3, or it may be supported in correlated relationship as illustrated in Figures 6 and 7.

When a conveyor as shown in Figure 11 or a guide such as that shown in Figures 9 and 10 is used, the pistons 10, arranged as shown in Figure 1, may interfere. Other means for applying the pressure to the roller 2 may, of course, be used, whereby this may be avoided. For example, the pressure may be applied at a higher elevation, even above the ring 1, or the shaft 4a may be pulled toward the shaft 4 instead of being pushed.

The relative diameters of the roller 2 and the ring 1 may be such as to give the desired horn angle between the outer surface of the roller and the inner surface of the ring. With coniferous and hard woods, it is desirable to have the diameter of the roller 2 approximately one half the inner diameter of the ring 1. With softer materials, an increase of the diameter of the roller with relation to the ring may be advantageous. A relation of roll diameter to ring diameter of not greater than about ⅔ to 1 and preferably not less than about ½ to 1 has been found to be a useful range, although variation may be desirable for particular uses; for example, with very large rings a somewhat smaller diameter of inner roller may be used.

With the apparatus of the type described herein satisfactory results have been obtained with a ring having an internal diameter of about 20 inches and an inner roller having a diameter of about 10 inches, the said ring rotating at a speed of about 4 revolutions per minute. Obviously other sizes of equipment and rates of speed may be used to advantage in other uses of the invention. For instance, higher or lower rates may be optimum from a commercial standpoint with certain material or in other sized equipment.

If desired, an automatic feed may be provided for supplying the material to the rollers, for instance, whereby strips or sheets of wood may be fed from the bottom of a stack.

In some instances it may be desirable to apply heat and cold during the treatment of the material. In that event the material may be put in hot or cold water or other fluids before the treatment, or the roller 2 or other parts of the device may be cooled or heated.

It is obvious that various combinations of the above described details may be used and it is not intended to limit the invention to the particular combinations illustrated.

As indicated above, the apparatus described may be used to advantage with many different substances. It may be used in the separation of various liquid values from annual, biennial and perennial vegetation and in the recovery of the remaining cellulose in a form particularly suited for subsequent treatment or use. Substances which are normally solid may also be removed, such removal being facilitated by the heat generated during the application of pressure. Thus various proteins, carbohydrates, fats, oils, fatty acids and similar materials, including amorphous resin, volatile oils, various nitrogenous substances, albuminoids, amides, fats, soluble carbohydrates, industrial alcohols, chlorophyll, medicinal ingredients, colloidal cellulose, etc. may be obtained in this way.

In the production of cellulose in improved condition for aftertreatment the relationship of moisture content, pressure and rate of application of pressure are important in bringing about the desired tearing apart of the fibre to form discrete particles. This relationship will vary of course depending upon the use to which the processed material is to be put.

As illustrative of some such applications of the invention but without intending to limit it to the various uses recited, it may be used to advantage in the separation of liquids and long cellulose fibres by passing henequen in a green state, or after soaking in water or other liquids, through the machine as described above. The cellulose materials separated may be dried and bleached by exposing them to the sunlight. Or the dried fibres or filaments may be separated and cleaned by rolling them in the hands or otherwise to recover long fibres, or filaments suitable for use in making rope, etc. Microscopic examination of the cellulosic fibres shows that the fibre walls are not injured in any manner and the filaments thus obtained from henequen appear to be actually stronger than hand retted fibres. The rapid and extensive removal of enzymes or other substances effecting the deterioration of the cellulose result in a stronger and more stable cellulosic product. The same is also true of other materials treated in this way. Or it may be subjected to a slight bleach and/or a soda or sulfate cook and made into paper. During the treatment for this purpose a total pressure of about 15,000 to 30,000 pounds may be applied per single leaf averaging about 3 inches. In the treatment of henequen to obtain fibres for rope, a pressure of about 15,000 to 24,000 pounds is preferred, while in the treatment to recover cellulose fibres for use in paper making, a pressure of about 25,000 to 35,000 pounds may be preferable, and for the recovery of cellulose fibres for use in making rayon, etc., even higher pressures may be advantageous.

The liquid recovered from the above treatment of henequen was found to contain about 11.0% total solids, 9.6% water soluble solids and 0.025% ether-chloroform extractable material when tested for alkaloids by the method prescribed by the U. S. P. XI. It was also found to contain alkaloids of the *Cannabis sativa* type. Upon standing the liquid ferments and various products of fermentation may be recovered.

Other examples of plant life of the long fibre species that may be treated with the apparatus described above are agaves, hemp, sansevieria, maguey, jute, ramie, bromelia pinquin, nettle, manila hemp, phormium tenax, abutilon, yercum, cabuya, roselle, denje (Nzonogwe), okra, bolabola (*Honckenya ficicfoha*), common hop, sparman, ginestra (*Sparticum junceum*), caroa (*Neoglaziovia variegata*), esparto, flax, coir, zapupe. The cellulose recovered may be used in the manufacture of paper and other products without applying a solvent cook. For example, agave (century plant), sansevieria and pineapple leaves, when subjected to pressures as described above, gave a light colored fibre merely by subjecting it to a sun bleach. A pure white color was obtained by a short period bleach with sodium hypochlorite. Paper was produced by applying pressures within the higher range given above, submitting the resulting cellulosic product to beater action with sodium hypochlorite (bleach) and making it up into paper in the usual way and without further chemical treatment.

The various liquids contained in these substances may be recovered and treated to separate the valuable constituents present in commercial quantities. The substances recovered may be used in their various usual ways or for new purposes.

The invention may also be applied to various types of tree wood for the recovery of the fluids contained in them for the recovery of cellulose in a form particularly adapted for subsequent use in the production of paper, rayon, Cellophane, etc. For example, pine, spruce, fir and poplar may be subjected to pressures as described herein. Or other coniferous or broad leaf woods, such as tulip, basswood, gum chestnut, maple, beech, birch, cypress, hemlock, cedar, mulberry and larch or other hard woods or the barks of various woods may be treated in a similar manner. Valuable liquids may also be obtained from the laurels, myrtles, quassia, copaiba and acacia trees.

It is preferred to cut the wood into strips of suitable size to feed to the machine and if desired the heart wood may be separated from the sap wood. It is also preferred to use wood cut in the spring or summer and while it still contains the increased amount of sap in such woods. The pressures to be applied will vary, depending upon wood used and upon the purpose for which the resultant cellulose is to be used. For example, spruce lends itself to treatment in about ¼ inch thicknesses at between about 20,000 and 30,000 pounds per line inch for the production of fibres useful for the production of paper, whereas southern pine is preferably treated at about 40,000 and 65,000 pounds per line inch, depending upon the classification and age of the wood. With thicker pieces or with harder wood, greater pressure will be required to accomplish the same separation and disruption or tearing apart of the cellulose fibres. Also, where the fibres are to be used for the production of rayon, Cellophane, etc., greater pressure may be applied to accomplish a more complete removal of the liquids and a greater breaking up of the fibres. Such pressure may, for example, go up to or exceed 100,000 pounds per linear inch of rollers in contact with the material being processed.

During the treatment of various substances, large quantities of liquids containing various suspended materials are obtained. These may be separated in various ways. For example, by settling and separation in various layers or by centrifugal separation, such separation to be with or without cooling or heating.

The present application is a division of my copending application 195,776 filed March 14, 1938, which, in turn, is in part a continuation of my copending applications 98,208 filed August 27, 1936, and 115,324 filed December 11, 1936.

No claim is made in this application to the various novel method features described herein, since these are described and claimed in the above mentioned application Serial No. 195,776 and other copending applications.

I claim:

1. An apparatus adapted for expressing liquids from fibrous materials, comprising a ring and a roller positioned to roll on or near the inner surface thereof and forced toward the said ring with great but yielding pressure, said ring being supported so as to permit it to dip and move the apex of the horn angle in the direction of rotation of the ring upon introduction of material between the ring and roller, and a guide conduit for guiding material into the pressure zone, said guide being correlated to move with the ring when the latter dips.

2. An apparatus adapted for expressing liquids from fibrous materials, comprising a ring and a roller positioned to roll on or near the inner surface thereof and forced toward the said ring with great but yielding pressure, said ring being supported so as to permit it to dip and move the apex of the horn angle in the direction of rotation of the ring upon introduction of material between the ring and roller, and a spiral curved guide adapted to receive long sections of flexible material and turn them into the plane of the pressure zone, said guide being correlated to move with the ring when the latter dips.

3. An apparatus adapted for expressing liquids from fibrous materials, comprising a ring and a roller positioned to roll on or near the inner surface thereof and forced toward the said ring with great but yielding pressure, said ring being supported so as to permit it to dip and move the apex of the horn angle in the direction of rotation of the ring upon introduction of material between the ring and roller, and a spiral curved guide adapted to receive flexible material and turn it into the plane of the pressure zone, said guide being correlated to move with the ring when the latter dips and having a roller adapted to depress the flexible material.

4. In a rolling mill, the combination of an annular ring, a single presser roller of smaller diameter than the interior diameter of the ring positioned within said ring, and yielding means for forcing the interior surface of the ring and the exterior surface of the roller toward each other, said ring being yieldingly supported and sufficiently rigid that upon introduction of material into the horn angle in the direction of tation of the ring and roller, the ring will be actuated as a unit against the pressure of the yielding means to move the apex of the horn angle along the surface of the roller in the direction of rotation of the roller to a position in advance of its normal position.

5. In a rolling mill, the combination of an annular ring, a presser roller of smaller diameter than the interior of the ring but having a diameter at least equal to the interior radius of the ring, and yielding means for forcing the interior surface of the ring and the exterior surface of the roller toward each other, said ring being yieldingly supported and sufficiently rigid that upon introduction of material into the horn angle in the direction of rotation of the ring and roller, the ring will be acuated as a unit against the pressure of the yielding means to move the apex of the horn angle along the surface of the roller in the direction of rotation of the roller to a position in advance of its normal position.

6. In a rolling mill, the combination of an annular ring, a roller positioned on each side of said ring and adapted to roll upon the outer and the adjacent inner surfaces of said ring opposite each other, and means for forcing said rollers toward each other with yielding force, said ring being so supported between said rollers and sufficiently rigid that upon introduction of material into the horn angle in the direction of rotation of the ring and roller, the ring will be actuated as a unit against the pressure of the yielding means to move the apex of the horn angle along the surface of the inner roller in the direction of rotation of the roller to a position in advance of its normal position.

7. In a rolling mill, the combination of an annular ring, a roller positioned on each side of said ring and adapted to roll upon the outer and the adjacent inner surfaces of said ring opposite each other, the outer one of said rollers being of such a larger diameter than the inner roller as to have the same peripheral speed as the outer surface of the ring when driven at the same angular speed as the inner roller, means for driving said rollers at the same angular speed, and means for forcing said rollers toward each other with yielding force, said ring being so supported between said rollers and sufficiently rigid that upon introduction of material into the horn angle in the direction of rotation of the ring and roller, the ring will be actuated as a unit against the pressure of the yielding means to move the apex of the horn angle along the surface of the inner roller in the direction of rotation of the roller to a position in advance of its normal position.

8. In a rolling mill, the combination of an annular ring, a single presser roller of smaller diameter than the interior diameter of the ring positioned within said ring, yielding means for forcing the interior surface of the ring and the exterior surface of the roller toward each other, said ring being yieldingly supported and sufficiently rigid that upon introduction of material into the horn angle in the direction of rotation of the ring and roller, the ring will be actuated as a unit against the pressure of the yielding means to move the apex of the horn angle along the surface of the roller in the direction of rotation of the roller to a position in advance of its normal position and yielding means bearing against the outer surface of said ring and resisting such shifting of the ring.

9. In a rolling mill, the combination of an annular ring, a roller positioned on each side of said ring and adapted to roll upon the outer and the adjacent inner surfaces of said ring opposite each other, means for forcing said rollers toward each other with yielding force, said ring being so supported between said rollers and sufficiently rigid that upon introduction of material into the horn angle in the direction of rotation of the ring and roller, the ring will be actuated as a unit against the pressure of the yielding means to move the apex of the horn angle along the surface of the inner roller in the direction of rotation of the roller to a position in advance of its normal position, and at least one adjustably yieldable antifriction roller bearing against the outer surface of said ring and resisting such shifting of the ring.

10. In a roller mill, the combination of an annular ring, a roller on a shaft in fixed bearings positioned to roll upon the outer surface of said ring, a roller of smaller diameter than and positioned within the said ring, said interior roller being carried on a shaft parallel to and movable toward the first mentioned shaft, and means for yieldingly forcing said interior roller toward said exterior roller, said ring being so supported between said rollers and sufficiently rigid that upon introduction of material into the horn angle in the direction of rotation of the ring and roller, the ring will be actuated as a unit against the pressure of the yielding means to move the apex of the horn angle along the surface of the inner roller in the direction of rotation of the roller to a position in advance of its normal position.

11. In a roller mill, the combination of an annular ring, a roller on a shaft in fixed bearings positioned to roll upon the outer surface of said ring, a roller of smaller diameter than and positioned within the said ring, said interior roller being carried on a shaft parallel to and movable toward the first mentioned shaft, means for yieldingly forcing said interior roller toward said exterior roller, said ring being so supported between said rollers and sufficiently rigid that upon introduction of material into the horn angle in the direction of rotation of the ring and roller, the ring will be actuated as a unit against the pressure of the yielding means to move the apex of the horn angle along the surface of the inner roller in the direction of rotation of the roller to a position in advance of its normal position, and yieldingly supported rollers positioned beneath said ring to resist such shifting of the ring.

12. A rolling mill as defined in claim 9 in which adjustable stops are provided, against one of which the support for each antifriction roller may be forced when sufficient pressure is applied thereto whereby the force resisting initial or subsequent movement of the ring may be regulated.

13. A rolling mill as defined in claim 8 in which both yielding means for the inner roller and the yielding means for the anti-friction rollers comprise independent gas cushions acting through independent hydraulic systems.

14. An apparatus adapted for expressing liquids from fibrous material, comprising an imperforate ring and an imperforate roller positioned to roll on or near the inner surface thereof and forced toward the said ring with great but yielding pressure, said ring and roller being on substantially horizontal axes, a guide adapted to guide material into the horn angle beneath the roller, said guide being provided with a perforated bottom.

15. An apparatus adapted for expressing liquids from fibrous material, comprising an imperforate ring and an imperforate roller positioned to roll on or near the inner surface thereof and forced toward the said ring with great but yielding pressure, said ring and roller being on substantially horizontal axes, a guide adapted to guide material into the horn angle beneath the roller, said guide being provided with a perforated bottom and having a roller adapted to depress the material fed through said guide.

16. An apparatus as defined in claim 1, including a cam surface positioned to move the correlated guide forwardly into the horn angle as the ring dips.

17. In a rolling mill, the combination of an annular ring, a presser roller of smaller diameter than the internal diameter of the ring, positioned within said ring, and yielding means for forcing the interior surface of the ring and the exterior surface of the roller toward each other, the ring being yieldingly supported and sufficiently rigid that upon introduction of material into the horn angle in the direction of rotation of the ring and roller, the ring will be actuated as a unit against the pressure of the yielding means to move the apex of the horn angle along the surface of the roller in the direction of rotation of the roller to a position in advance of its normal position, such movement of the ring being resisted by lateral movement of the roller against the said yielding means.

18. In a rolling mill, the combination of an annular ring, a roller positioned on each side of said ring and adapted to roll upon the outer and the adjacent inner surfaces of said ring opposite each other, and means for forcing said rollers toward each other with yielding force, the ring being so supported between said rollers and sufficiently rigid that upon introduction of material into the horn angle in the direction of rotation of the ring and roller, the ring will pry the rollers apart against the said yielding force and move the apex of the horn angle along the surface of the inner roller in the direction of rotation of the roller to a position in advance of its normal position.

19. An apparatus as defined in claim 18 in which the movement of the ring is further resisted by yielding means bearing against the outer surface of the ring.

20. In a rolling mill, the combination of an annular ring, means having circular rotatable surfaces positioned on each side of said ring, said circular surfaces being adapted to roll upon the outer and the adjacent inner surfaces of said ring opposite each other, one of said means being supported in fixed bearings, and means for forcing the other of said means toward the one in fixed bearings with yielding force, the said ring being so supported between said circular surfaces and sufficiently rigid that upon introduction of material between the ring and one of said circular surfaces in the direction of rotation of the ring, the ring will be actuated as a unit to move about the surface of the fixed means as a fulcrum and thereby serve as a lever to pry the rotatable surfaces apart against the said yielding force.

21. In a rolling mill, the combination of an annular ring, a roller positioned on each side of said ring and adapted to roll upon the outer and the adjacent inner surfaces of the ring opposite each other, means for forcing said rollers toward each other with yielding force, the ring being supported between the rollers and sufficiently rigid that upon introduction of the material in the horn angle in the direction of rotation of the ring and roller, the ring will pry the rollers apart against the said yielding force and move the apex of the horn angle along the surface of the inner roller in the direction of rotation of the roller to a position in advance of its normal position, and means for positively driving the roller adapted to roll upon the inner surface of said ring.

MATTHEW J. STACOM.

CERTIFICATE OF CORRECTION.

Patent No. 2,229,143. January 21, 1941.

MATTHEW J. STACOM.

It is hereby certified that error appears in the above numbered patent requiring correction as follows: In the drawing, sheet 4, Fig. 11, for the numeral "52a" read --52b--; and in the printed specification, page 2, second column, line 45, for "of a cylinder" read --in a cylinder--; page 6, first column, line 46, after "them" insert --and--; same page, second column, line 61, claim 3, strike out the word "spiral"; line 62, after "material" insert --at the side of the apparatus--; line 63, same claim 3, after "it" insert --upwardly--; line 74-75, claim 4, for "materital" read --material--; page 7, second column, line 59, claim 12, after "regulated" insert a period; lines 61 and 62, claim 13, strike out the words "for the inner roller and the yielding means for the anti-friction rollers"; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.